Sept. 13, 1960   J. P. BRUCK   2,952,146
SLIP CLUTCH
Filed Jan. 6, 1958
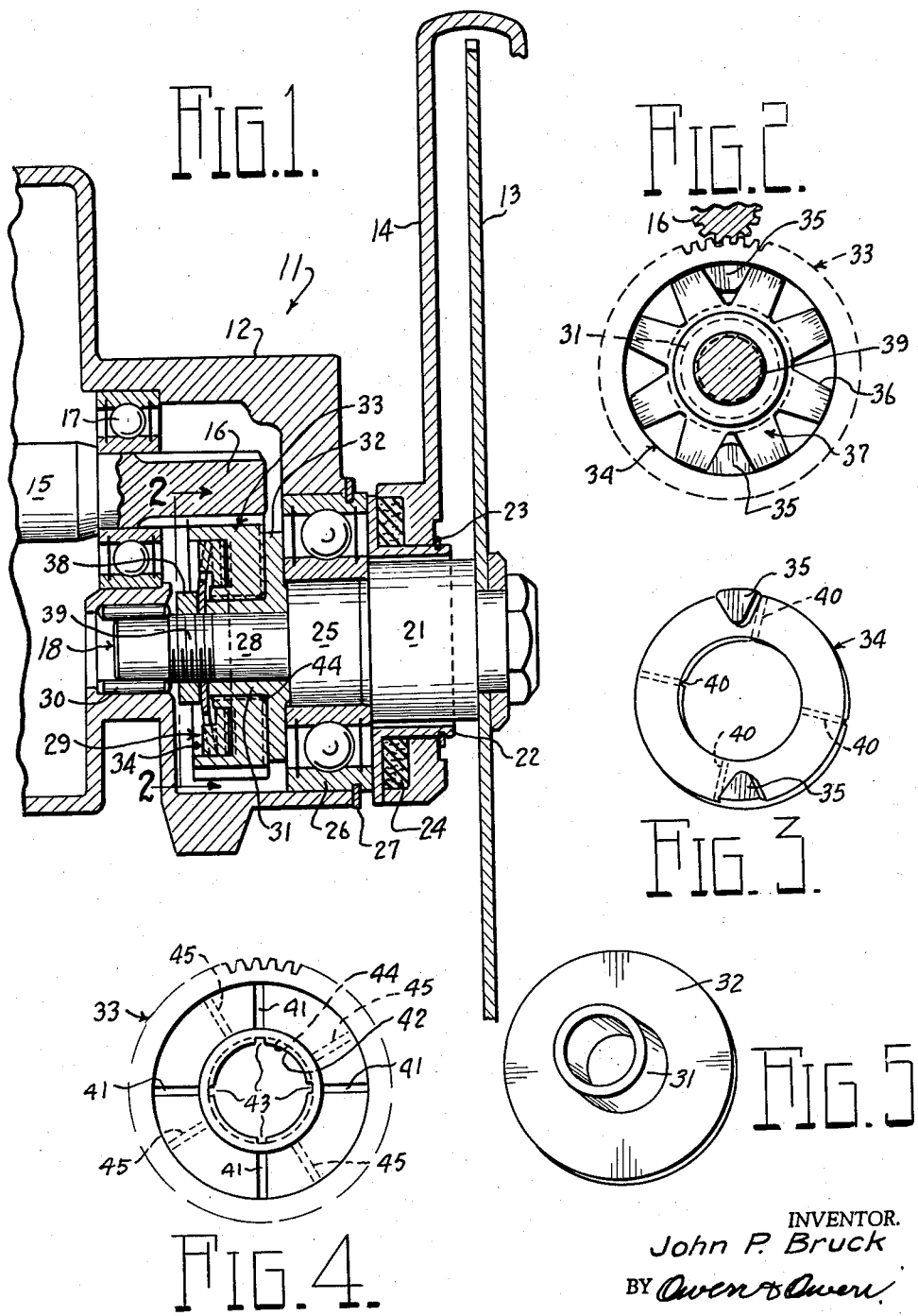
INVENTOR.
John P. Bruck
BY Owen & Owen
ATTORNEYS _United States Patent Office_

2,952,146
Patented Sept. 13, 1960

2,952,146

SLIP CLUTCH

John P. Bruck, Toledo, Ohio, assignor to American-Lincoln Corporation, Toledo, Ohio, a corporation of Ohio Filed Jan. 6, 1958, Ser. No. 707,312

2 Claims. (Cl. 64—30)

This invention pertains to slip clutches and more particularly to a slip clutch that can be stopped and started many successive times without materially reducing its effectiveness and that will consistently slip when a given load is applied.

Various slip clutches are known in the art and are usually satisfactory for use in most mechanisms. However, in some instances, the operation of a mechanism involves a multiplicity of successive stops and starts. An example of this is the drive mechanism for a circular saw, the blade of which must be driven at a high rate of speed and with high torque, yet be quickly stopped when a knot or other obstacle is encountered in the material being sawed, to prevent burning out or over-heating the motor. For knotty wood particularly, a large number of successive stops and starts may occur in a short period of time. Many previously known slip clutches cannot withstand many such stops and starts without resulting in seizing or galling, in which case the motor will stall and will be burned out or excessively over-heated. With other known clutches, the clutch faces will excessively wear so that undue slippage occurs after a relatively small number of starts and stops, and the motor is prevented from transmitting sufficient torque to the blade.

Previously known slip clutches used in the drive mechanisms of power saws and the like are adjustable by means of a nut which can be turned to vary the amount of torque applied to the blade which will cause the clutch to slip. If the nut is tightened, the clutch will slip when a higher torque is applied and if the nut is loosened, the clutch will slip when a lower torque is applied. There are two difficulties with such adjustable clutches. First, a small adjustment of the nut, particularly by an unskilled person, may cause the clutch to slip only when very high torque is encountered and thereby cause the driving motor to burn out or over-heat, or may cause the clutch to slip too readily so that sufficient power cannot be transmitted through the clutch by the motor. Second, during operation of the mechanism in which the clutch is employed, the nut may be caused to loosen or tighten and thereby produce an undesired and detrimental change in the amount of torque necessary to produce slipping.

The present invention proposes a slip clutch that can stop and start successively a large number of times without seizing and causing the motor to burn up and without excessively slipping and causing undue loss of power from the motor to the sawing blade. Thus, a clutch designed according to the principles of the invention will function well in mechanisms whose operations involve repeated stalls as well as in mechanisms whose operations are continuous. Such a clutch, in the present instance comprises a sintered steel alloy gear and clutch members associated therewith for engaging the gear, which members are made of sintered bronze impregnated with oil. While it would not be expected that such clutch members could engage the gear with sufficient friction to enable proper transmission of torque to the gear, the opposite has been proven true.

A clutch designed according to the invention provides sufficient frictional resistance and yet proper slippage when a predetermined torque is exceeded. This torque will not be changed when a nut, by means of which force is applied to the clutch faces, is tightened beyond a predetermined amount. Further, the nut cannot easily be maladjusted during operation of the mechanism in which the clutch is employed.

It is, therefore, an object of the invention to provide a clutch that effectively functions after a large number of successive stops and starts.

Another object of the invention is to provide an improved clutch for use with power saw drives and other mechanisms in which the clutch is subjected to repeated stalls or stops and starts.

A further object of the invention is to provide a clutch that cannot easily become out of adjustment and which will slip whenever a substantially constant torque is applied.

Other objects of the invention will be suggested from the following detailed description of a preferred embodiment thereof, reference being made to the accompanying drawings, in which:

Fig. 1 is a fragmentary view in cross section of a circular saw embodying a clutch according to the invention, Fig. 2 is a view partially in cross section taken on line 2—2 of Fig. 1, Fig. 3 is a view in perspective of the inner clutch member shown in Fig. 1, Fig. 4 is a front view of the gear with which the clutch members engage, and Fig. 5 is a view in perspective of the outer clutch member shown in Fig. 1.

Fig. 1 shows a circular power saw, generally indicated at 11, which comprises a housing 12, a circular saw blade 13, and a protective guard 14. A motor (not shown), which is contained within the housing 12, drives a shaft 15 which has a pinion gear 16 at an end portion thereof. The shaft 15 is suitably journaled in a bearing 17 which is supported in a portion of the housing 12. A power-take-off shaft 18 is located parallel to the shaft 15 and extends out of the housing 12 and carries the blade 13. The shaft 18 has an outer portion 21 of large diameter, which portion extends through a sleeve 22 that is attached to the housing 12 and, in turn, supports the guard 14 that is fixed thereto by a retaining ring 23 with packing 24 therebetween. An intermediate portion 25 of the shaft 18 is pressure fit in the inner race of a ball bearing 26, the outer race of which is supported by a portion of the housing 12 and by a retaining ring 27. An inner portion 28 of the shaft 18 is of the smallest diameter of the three portions and extends through a clutch 29 into a needle roll bearing 30.

The clutch 29 transmits power from the drive shaft 15 to the power-take-off shaft 18 and includes a clutch member or plate 32 integral with a sleeve 31 that is located on the inner portion 28 of the shaft 18 with either a pressure fit or a slip fit. With a pressure fit, the clutch flange or plate 32 and the sleeve 31 transmit power to the shaft 18 principally through the inner portion 28 of the shaft 18. With a slip fit, the clutch plate 32 and the sleeve 31 transmit power to the shaft 18 principally through the shoulder of the intermediate portion 25 of the shaft 18. A gear 33, driven by the pinion gear 16, is located on the sleeve 31 and is free to rotate thereon. A second clutch member or washer 34 is located in an annular recess in the gear 33 and includes two diametrically spaced lugs 35 (see Figs. 2 and 3 also) which are engaged by the radial fingers 36 of a Belleville type spring 37 that maintains pressure on the washer 34 to cause it to frictionally engage the face of the recess in the gear 33. The drive spring 37, in turn, is maintained in lateral compression by a jam nut 38 that is screwed on a threaded portion 39 of the shaft 18. The nut 38 and the portion 39 have right hand threads so that when the blade 13 is rotated in a counterclockwise direction, as viewed from the right end, slipping of the clutch 29 tends to tighten the nut 38.

Tightening of the nut 38 is limited, however, by the adjacent end of the sleeve 31 which protrudes beyond the gear 33. When the nut 38 has been tightened to the point where the washer 34 is firmly held between the end of the sleeve 31 and the nut 38, additional torque applied to the nut 38 will not increase the force of the spring 37 on the washer 34. Hence, further tightening of the nut 38 does not change the amount of torque required to make the clutch 29 slip. This is particularly true if the sleeve 31 is located on the portion 28 of the shaft 18 with a pressure fit, so that the frictional resistance between the inner surface of the sleeve 31 and the surface of the inner portion 8 of the shaft 18 is greater than the frictional resistance between the faces of the gear 33 and the faces of the clutch plate 32 and the drive washer 34. This will also be substantially true if the sleeve 31 is located on the portion 28 of the shaft 18 with a slip fit. However, in this case, the nut 38 must be tightened sufficiently to move the plate 32 snugly against the shoulder of the intermediate portion 25 so that the frictional resistance between the clutch plate 32 and the shoulder of the intermediate portion 25 of the shaft 18 exceeds the frictional resistance between the coacting faces of the gear 33 and the clutch plate 32 as induced by the clutch washer 34. In either case, however, a relatively light torque can be applied to the nut 38, which torque, if exceeded, will not affect the amount of torque applied to the saw blade 13 that is necessary to cause the clutch 29 to slip. Such is made possible because the sleeve 31 extends through and beyond the gear 33 and limits the inward movement of the nut 38 and the spring 37. The compressive force exerted on the spring 36 by the nut 38 and, hence, the force exerted on the washer 34 by the spring 37 are also limited. This is a considerable improvement over conventional clutches in which further tightening of a similar nut can increase the amount of torque at which the clutch will slip at least to the point where the central portion of the spring is forced against the gear itself.

The long life and dependable operation of the clutch 29 are made possible because the clutch plate 32 and the washer 34 are made of sintered bronze rather than steel, as in conventional clutch members and the gear 33 is preferably made of a sintered alloy of 4140 steel. The clutch members are preferably first pressed to size and then sintered so that porosity can be maintained although it is possible to machine these members with sharp tools, using slow feeds and high speeds. If porosity should be impaired, it can be regained by etching the members in suitable acid. The sintered clutch members can be properly impregnated with oil by soaking them for instance in No. 10 lubricating oil, without additives, for approximately one-half hour. The oil can be heated, if desired, to obtain proper viscosity. While the clutch plate 32 should be impregnated with oil, the clutch washer 34 need not be, although such is preferred.

Lubrication of the clutch faces is maintained while the clutch is in operation. This is accomplished by a plurality of lubricant grooves located in the appropriate surfaces of the various members and around which lubricant is packed. Any suitable lubricant can be used that will not leak through the bearing seals but will still be of suitable viscosity to flow through the oil grooves; further, the lubricant must be able to withstand the heat and pressures associated with such clutches. For continuous lubrication, the washer 34 and the adjacent face of the gear 33 are each provided with four radial lubricant grooves 40 (Fig. 3) and 41 (Fig. 4) respectively, by means of which lubricant can be supplied to the clutch faces of these members. The axial bore 42 in the gear 33 has four longitudinal grooves 43 which communicate with an annular recess 44 located on the face of the gear 33 adjacent the plate 32. In addition, four radial grooves 45 extend from the annular recess 44 outwardly past the periphery of the clutch plate 32 so that lubricant can be applied to this clutch face from either direction.

In operation, the drive gear 16 dirves the gear 33 which causes the shaft 18 to rotate due to the frictional engagement of the plate 32 and the washer 34 with the respective faces of the gear 33. Torque is then transmitted through the clutch plate 32 and the sleeve 31 radially to the shaft 18 and/or axially to the side of the intermediate portion 25 of the shaft 18, depending on whether there is a pressure fit or a slip fit. If the blade 13 hits a knot or other obstacle, it tends to stall or stop and the gear 33 slips with respect to the washer 34 and the plate 32. Thus, the motor does not stall but, rather, continues to drive the gear 16 and rotate the gear 33 which then slips with respect to the shaft 18.

Examples from a number of tests made with a clutch designed according to the invention illustrate the effectiveness of this clutch when a large number of successive stops and starts were made. In these tests, the nut 38 was tightened to a torque of about 17 ft. lbs. which was sufficient to cause the frictional resistance of the sleeve 31 and the shaft 18 to exceed the frictional resistance between the faces of the plate 32 and washer 34 and the gear 33, regardless of whether a tight or a loose fit was maintained between the portion 28 and the sleeve 31. The blade 13 then stalled and the clutch 29 slipped when 9.5 to 10.5 ft. lbs. of torque were applied to the blade 13. The torque was successively applied 1000 times, at each application after the blade 13 had obtained full speed and this continued until the blade was stopped, at which time the current input to the motor was measured. The clutch 29 was considered to be ineffective when the current input fell below approximately 14 amperes since, when amperage was maintained above this point, sufficient power was transmitted through a 7.5 inch saw blade to enable it to saw through a ¾ inch pine plank.

*Test I*

The following results were obtained when the clutch plate 32, which had been machined in this case, was acid etched to regain porosity and relubricated.

| Number of successive stops: | Amperes |
| --- | --- |
| At start | 31 |
| At 20 | 28 |
| 20–240 | 23–28 |
| 240–900 | 16–18 |
| 900–1000 | 14–16 |

*Test II*

In this test, the clutch plate 32 was engaged with the shaft 18 with a pressure fit between the bore 42 and the surface of the inner portion 28 of the shaft 18.

| Number of successive stops: | Amperes |
| --- | --- |
| At start | 30 |
| At 20 | 22 |
| 20–300 | 19–22 |
| 300–380 | 15–18 |
| 380–660 | 14–15 |
| 660–820 | 13–14 |
| 820–1000 | 12–13 |

*Test III*

The following results were obtained when the grooves 45 in the clutch face of the gear 33 adjacent the plate 32 were widened from 1/32 inch to 1/8 inch.

| Number of successive stops: | Amperes |
|---|---|
| At start | 30 |
| At 20 | 22 |
| 20–440 | 18–20 |
| 440–540 | 20–25 |
| 540–1000 | 14–17 |

*Test IV*

In this test, the drive washer 34 was also oil impregnated along with the clutch plate 32, but the face of the gear 33 adjacent the plate 32 had been ground which undoubtedly reduced its porosity.

| Number of successive stops: | Amperes |
|---|---|
| At start | 29 |
| At 20 | 25 |
| 20–100 | 22–25 |
| 100–660 | 16–19 |
| 660–1000 | 15–16 |

In these tests, the clutch 29 was found to be effective in all cases up to at least 600 stops and starts. Further, the tests indicated that maintenance of porosity was important and that it was not necessary to have a tight fit between the sleeve 31 and the shaft 18. In contrast, conventional clutches are not effective above 100–200 stops and starts, due to seizing or excessive wear.

A clutch according to the invention basically comprises a shaft, a gear rotatable about said shaft, a clutch plate adjacent a face of the gear, a clutch member acting against the opposing face of the gear, and means for exerting force on the clutch through said member. The clutch plate and member are made of sintered bronze. Also the clutch plate and, preferably, the clutch member are impregnated or soaked with oil.

Various embodiments of the invention will be suggested from the above detailed description. Such embodiments can be incorporated without departing from the scope of the invention as defined in the depending claims.

I claim:

1. A clutch for a circular saw or the like which includes a driven shaft, said clutch comprising a sleeve adapted to be located on the shaft and in frictional contact with a portion thereof, a clutch plate affixed to said sleeve, said plate being made of sintered material and impregnated with oil, a gear located around said sleeve with a face thereof adjacent said plate and the opposite face thereof having an annular recess, said sleeve extending through said gear past the face with the annular recess, a clutch washer located in the recess, said washer being made of sintered material, a Belleville type spring located about said shaft adjacent the end of said sleeve that extends through said gear, and a nut adapted to be threaded on a portion of said shaft adjacent said spring, whereby said spring maintains a maximum force on said washer when said spring is held between said end of said sleeve and said nut and further tightening of said nut does not increase this force.

2. A clutch for a circular saw or the like which includes a driven shaft having a threaded end, said clutch comprising a sleeve adapted to be located on the shaft and in frictional contact with a portion thereof, a clutch plate affixed to said sleeve, said plate being made of sintered material impregnated with oil, a gear located around said sleeve and free to rotate thereon with a face thereof adjacent said clutch plate, a clutch washer located adjacent the opposite face of said gear, said washer being made of sintered material, said sleeve extending through said gear past said opposite face and past a face of said clutch washer on the side opposite said gear, an annular spring located around the threaded portion of said shaft adjacent the end of said sleeve extending through said gear and said washer, and a nut adapted to be threaded on said shaft adjacent said spring to force an outer portion thereof against said washer, to increase frictional contact between said clutch washer and the adjacent face of said gear and between said clutch plate and the adjacent face of said gear, whereby said sleeve limits the extent of movement of said nut toward said clutch washer and limits the amount of force exerted by said annular spring on said clutch washer.

References Cited in the file of this patent

UNITED STATES PATENTS

| 2,421,925 | Cooley | June 10, 1947 |
| 2,568,245 | McDonald | Sept. 18, 1951 |
| 2,782,813 | Dudek | Feb. 26, 1957 |
| 2,857,750 | Fox | Oct. 28, 1958 |